(No Model.)
I., S. & W. SMITH.
SIREN.
No. 539,711. Patented May 21, 1895.
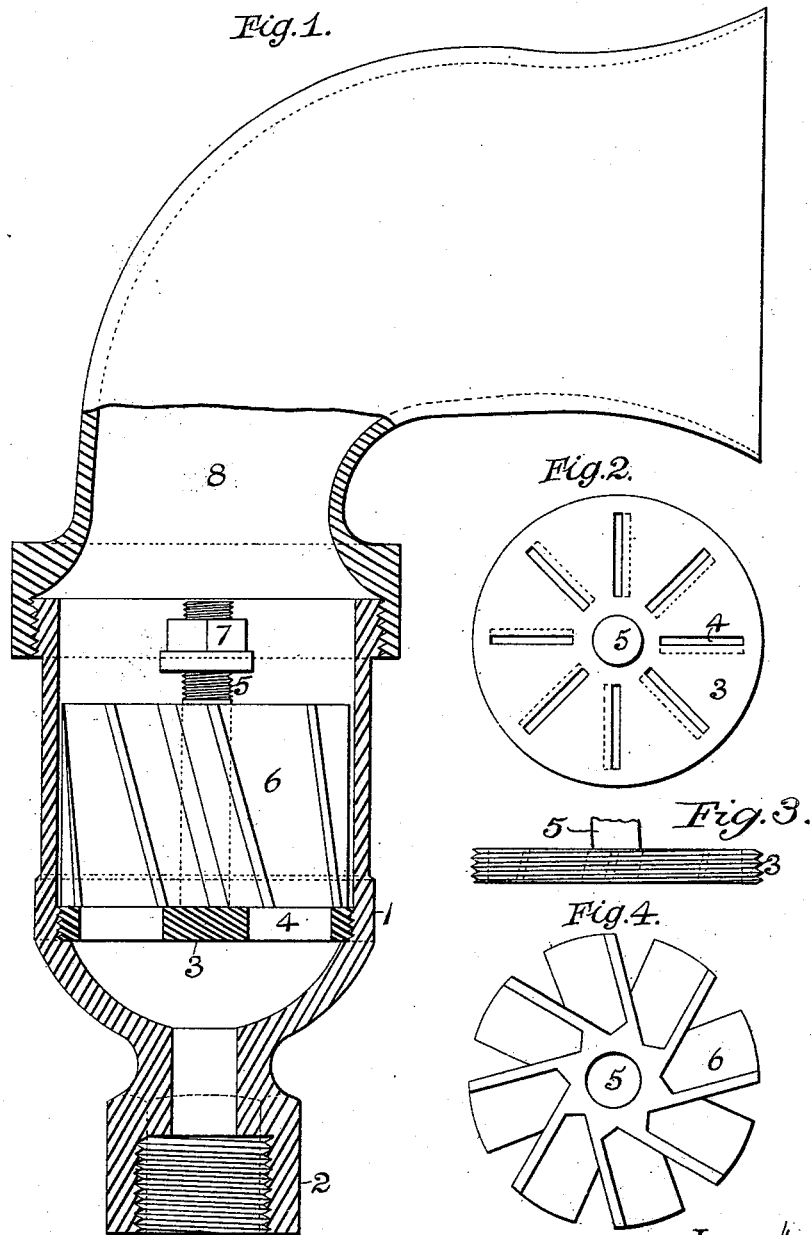

UNITED STATES PATENT OFFICE.

ISAAC SMITH, SAMUEL SMITH, AND WILLIAM SMITH, OF BASFORD, ENGLAND.

SIREN.

SPECIFICATION forming part of Letters Patent No. 539,711, dated May 21, 1895.

Application filed January 28, 1895. Serial No. 536,493. (No model.)

*To all whom it may concern:*

Be it known that we, ISAAC SMITH, SAMUEL SMITH, and WILLIAM SMITH, brass-founders and steam-gage manufacturers, subjects of the Queen of Great Britain, and residents of Basford, in the county of Nottingham, England, have jointly invented certain new and useful Improvements in Sirens, of which the following is a specification, reference being had to the accompanying drawings.

Figures 1 to 4 illustrate the improvements in sirens. Fig. 1 shows a side view of an improved siren with a chamber 1, hereinafter referred to, in section. Fig. 2 shows a plan of a perforated plate 3, with an axle pin or stalk 5 cast or screwed on it. The perforations may be either holes or slots. Fig. 3 is an edge view of the plate 3; and Fig. 4, a plan of a boss with radiating vanes 6, which may be placed at an angle or perpendicular to the boss.

Similar numerals of reference designate corresponding parts in the different figures where necessary.

The improvements consist of a casing 1 (shown at Fig. 1) provided with a screw threaded nut or flange 2 forming an inlet at the bottom to connect it to a steam or compressed air or other suitable fluid supply.

A short distance from the bottom the chamber in the casing 1 is provided with a horizontal plate 3 perforated with radiating slots 4 formed at an angle to the face of the plate. An axle pin or stalk 5 projects vertically from the plate on which a boss provided with radiating vanes 6 revolves. The vanes may be placed vertical or at an angle to the boss reverse to the angle of the slots in the horizontal plate 3. The rise and fall of the vaned boss may be regulated by a screw threaded nut 7 on the upper screw threaded end of the pin or stalk 5.

The top of the chamber 1 is screw threaded to engage with the screw threaded lower end of a straight or curved trumpet ended termination 8.

When in use upon steam or compressed air being admitted through the inlet of the casing, such steam or compressed air escapes through the slots 4 shown at Figs. 1 and 2 and impinges on the vanes 6 of the boss causing it to revolve, producing a powerful penetrating sound from the lowest bass to the highest octave according to the number of the slots and amount of steam or compressed air admitted.

What we claim is—

1. The combination in a siren, of a casing having a fluid inlet, a plate arranged in the casing and having angular slots or radial perforations, a perpendicular shaft rising from said plate, and a boss having radial vanes and rotatable upon and slidable perpendicularly on the said shaft, for producing the desired sound when a fluid is introduced into the casing and impinges against the radial vanes, substantially as described.

2. The combination in a siren, of a casing having a fluid inlet, a plate 3 arranged in the casing and having angular slots or radial perforations 4, a perpendicular shaft 5 rising from said plate and provided with a screw-threaded upper end portion, a boss rotating and rising and falling upon said shaft and provided with radiating vanes 6, for producing the desired sound when fluid is introduced into the casing and impinges against the radiating vanes, and a nut adjustable on the screw-threaded end of the shaft to control the extent of rising movement of the vane carrying boss, substantially as described.

In witness whereof we have hereunto set our hands this 18th day of January, 1895.

ISAAC SMITH.
SAMUEL SMITH.
WILLIAM SMITH.

Witnesses:
H. W. GOUGH, *C. E.*,
J. H. GOUGH.